United States Patent

Miyake et al.

[11] Patent Number: 5,959,018
[45] Date of Patent: Sep. 28, 1999

[54] RTV ORGANOPOLYSILOXANE COMPOSITIONS

[75] Inventors: Masatoshi Miyake; Takafumi Sakamoto; Hironao Fujiki; Kazukiyo Nagai, all of Usui-gun, Japan

[73] Assignee: Shin-Etsu Chemical Co., Ltd., Japan

[21] Appl. No.: 08/985,086

[22] Filed: Dec. 4, 1997

[30] Foreign Application Priority Data

Dec. 6, 1996 [JP] Japan ................................. 8-342761

[51] Int. Cl.$^6$ ............................................. C08K 3/00
[52] U.S. Cl. ............................................... 524/425
[58] Field of Search ........................................... 524/425

[56] References Cited

U.S. PATENT DOCUMENTS

| 5,302,648 | 4/1994 | Fujimoto et al. | 524/200 |
| 5,405,889 | 4/1995 | Hatanaka et al. | 523/210 |

FOREIGN PATENT DOCUMENTS

| 438 221 | 7/1991 | European Pat. Off. . |
| 438221 | 7/1991 | European Pat. Off. . |
| 572 927 | 12/1993 | European Pat. Off. . |

OTHER PUBLICATIONS

Derwent Abstract JP 57135867.

*Primary Examiner*—Edward J. Cain
*Attorney, Agent, or Firm*—Miller, White, Zelano & Branigan, P.C.

[57] ABSTRACT

The invention provides an RTV organopolysiloxane composition comprising (A) a terminally di- or trifunctional organopolysiloxane, (B) an alkoxysilane, (C) calcium carbonate surface treated with a carboxylic acid having a melting point of at least 100° C., and (D) a condensation catalyst. The composition cures into a cured product capable of forming a durably thermoresistant and water immersion-resistant bond to substrates such as surface treated aluminum members, fluoro-resin coated steel strips and acrylic resin electrodeposited steel strips.

7 Claims, No Drawings

RTV ORGANOPOLYSILOXANE COMPOSITIONS

BACKGROUND OF THE INVENTION

1. Field of the Invention

This invention relates to room temperature vulcanizable (RTV) organopolysiloxane compositions which are readily vulcanizable with moisture in the air to form rubbery elastomers and more particularly, to such RTV compositions which are vulcanizable into rubbery elastomers having improved water immersion-resistant and thermoresistant adhesion to substrates which are otherwise difficult to bond.

2. Prior Art

Of prior art room temperature vulcanizable (RTV) organopolysiloxane compositions, one-part RTV silicone compositions are well known. These compositions are stored in the absence of moisture. When it is desired to cure the composition, the package is opened and the composition is applied to any desired site whereupon it reacts with moisture in the air and cures into a rubbery elastomer.

Early RTV organopolysiloxane compositions were comprised of a silanol-terminated polymer, an acyloxy crosslinking agent and a tin catalyst. Alkoxy functional type compositions were then developed. More illustratively, Nitzsche and Wick U.S. Pat. No. 3,065,194 discloses a silicone rubber composition comprising a diorganopolysiloxane having a silanol end-blocking group, an alkoxy functional cross-linking agent, and a metal salt of a chelate organometallic compound serving as a crosslinking catalyst. Other one-part alkoxy functional RTV compositions include a composition of a silanol end-blocked diorganopolysiloxane premixed with a crosslinking catalyst as disclosed in Brown et al. U.S. Pat. No. 3,161,614 and a composition comprising an alkoxy end-blocked linear siloxane polymer and a solid catalyst as disclosed in Cooper et al. U.S. Pat. No. 3,383,355. Furthermore, U.S. Pat. No. 3,499,859 discloses a hydrocarboxy end-blocked diorganopolysiloxane polymer and a metal-containing curing catalyst used in combination with boron nitride. Cooper et al., U.S. Pat. No. 3,542,901 discloses a composition comprising a mixture of a linear siloxane having di- or tri-functional end-blocking units and a linear siloxane having a chemically non-functional inert end-blocking unit at one end and a di- or tri-functional end-blocking unit at another end, a catalyst, and a crosslinking agent. Brown et al. U.S. Pat. No. 3,122,522 discloses an organopolysiloxane intermediate containing cellosolvoxyl blendable with a catalyst. Weyenberg U.S. Pat. No. 3,175,993 discloses an organopolysiloxane intermediate end blocked with an alkoxylated silcarbane group together with a catalyst.

However, the aforementioned catalysts are disadvantageous in these alkoxy systems, and the titanium salts disclosed are likely to gel and give rise to an undesirable viscosity increase during mixing and long-term storage prior to use.

As solutions to these problems, Smith and Hamilton U.S. Pat. No. 3,689,454 and 3,779,986, Weyenberg U.S. Pat. No. 3,294,739 and 3,334,067, and Clark et al. U.S. Pat. No. 3,719,635 disclose alkoxy-curable compositions utilizing titanium ester chelate catalysts instead of the metal salts of the aforementioned patents. The titanium chelate catalysts serve to control gelation and control an undesirable viscosity increase during mixing and storage for a long term of 1 or 2 years. More specifically, in conjunction with the one-part type alkoxy RTV composition, Weyenberg U.S. Pat. No. 3,294,739 and 3,334,067 disclose titanium chelate catalysts which are advantageously used to prepare appropriate curable compositions.

These prior art RTV organopolysiloxane compositions, however, have problems in adhesion to aluminum stocks which have been surface treated for good weatherability. When the RTV compositions are applied to such aluminum stocks, long-term heating and water immersion can result in peeling. Without primers, these compositions do not bond well to difficult-to-bond substrates which have recently enjoyed a widespread use, for example, fluoro-resin coated steel strips and acrylic resin electrodeposited steel strips. Additionally thermoresistant and water immersion-resistant adhesion is unsatisfactory. An improvement in these problems is thus desired.

SUMMARY OF THE INVENTION

An object of the invention is to provide an RTV organopolysiloxane composition which cures into a cured product capable of forming a satisfactory bond to difficult-to-bond substrates such as surface treated aluminum members, fluoro-resin coated steel strips and acrylic resin electrodeposited steel strips while the bond is resistant to heat and water immersion.

We have found that by blending an organopolysiloxane of the following general formula (1), a silane of the following general formula (2), surface treated calcium carbonate, and a condensation catalyst, there is obtained an RTV organopolysiloxane composition of the dealcoholysis one-part type which cures into a cured product capable of forming a satisfactory bond to difficult-to-bond substrates such as surface treated aluminum members, fluoro-resin coated steel strips and acrylic resin electrodeposited steel strips without a need for a primer. The cured product maintains a highly heat-resistant and water immersion-resistant bond. The composition is shelf stable.

Therefore, the present invention provides a room temperature vulcanizable (RTV) organopolysiloxane composition comprising (A) an organopolysiloxane of the following general formula (1), (B) a silane of the following general formula (2), (C) calcium carbonate surface treated with a carboxylic acid having a melting point of at least 100° C., and (D) a condensation catalyst.

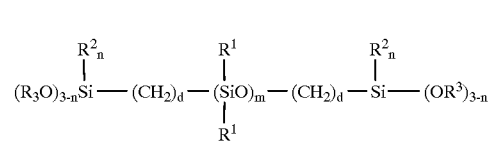

(1)

$R^1$ and $R^2$ are independently selected from substituted or unsubstituted monovalent hydrocarbon groups, $R^3$ is a methyl, ethyl, propyl, butyl or vinyl group, letter m is a positive integer, d is an integer of 0 to 10, and n is equal to 0 or 1.

(2)

$R^4$ is a methyl, ethyl, propyl, butyl or vinyl group, $R^5$ is a substituted or unsubstituted monovalent hydrocarbon group, and letter a is equal to 0 or 1.

DETAILED DESCRIPTION OF THE INVENTION

A first component (A) of the RTV organopolysiloxane composition of the invention is an organopolysiloxane of the following general formula (1):

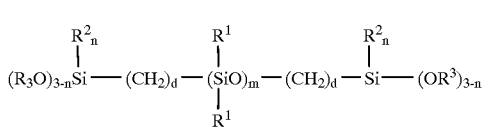

wherein $R^1$ and $R^2$, which may be identical or different, are selected from substituted or unsubstituted monovalent hydrocarbon groups, $R^3$ is a methyl, ethyl, propyl, butyl or vinyl group, letter m is a positive integer, d is an integer of 0 to 10, and n is equal to 0 or 1.

In formula (1), each of $R^1$ and $R^2$ is a substituted or unsubstituted monovalent hydrocarbon group, preferably having 1 to 10 carbon atoms, more preferably 1 to 8 carbon atoms, for example, alkyl groups such as methyl, ethyl, propyl, butyl, and hexyl, aryl groups such as phenyl and tolyl, aralkyl groups such as vinyl, allyl, butenyl, benzyl and 2-phenylethyl, and substituted ones of these groups wherein some or all of the hydrogen atoms each attached to a carbon atom are replaced by halogen atoms and cyano groups, such as chloromethyl, trifluoropropyl, and cyanoethyl. Of these, methyl, phenyl, vinyl, and trifluoropropyl are preferred. Methyl is most preferred because of the ease of synthesis of the organopolysiloxane. $R^3$ is a substituent selected from the group consisting of methyl, ethyl, propyl, butyl and vinyl.

Letter d is an integer of 0 to 10, preferably equal to 0 or 2 because of the ease of synthesis and the cost of the organopolysiloxane. Letter n is equal to 0 or 1. Then the organopolysiloxane of formula (1) is an organopolysiloxane having a di- or trifunctional terminal. The organopolysiloxane having a difunctional terminal is preferred from the standpoint of storage.

Letter m representative of a degree of polymerization is a positive integer, preferably in the range of 50 to 2,000, more preferably 300 to 1,000 from the standpoints of viscosity and ease of working. The organopolysiloxane of formula (1) preferably has a viscosity of 50 to 1,000,000 cs, more preferably 5,000 to 100,000 cs at 25° C.

Examples of the organopolysiloxane of formula (1) are given below by chemical formulae.

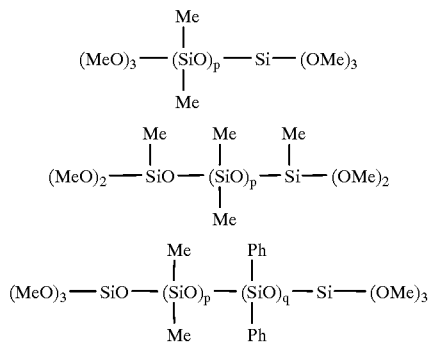

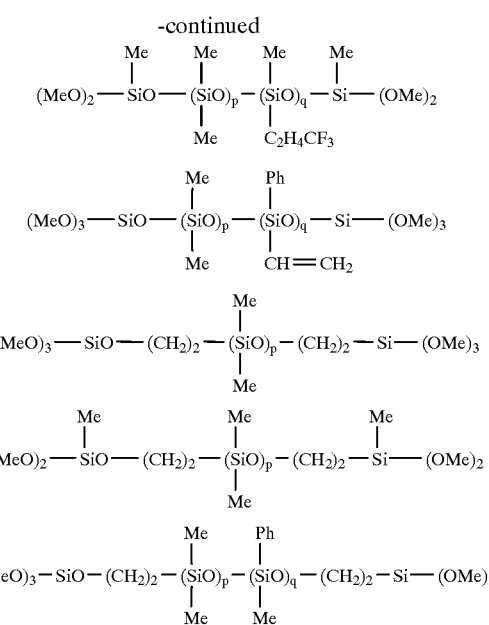

Note that Me is methyl, Ph is phenyl, letters p and q are positive integers, and p (in case of the formulae which do not show "q") or the sum of p+q (in case of the formulae which show "q") is an integer corresponding to m.

A second component (B) is a silane of the following general formula (2):

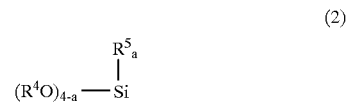

wherein $R^4$ is a methyl, ethyl, propyl, butyl or vinyl group, $R^5$ is a substituted or unsubstituted monovalent hydrocarbon group, and letter a is equal to 0 or 1.

In formula (2), $R^4$ is a methyl, ethyl, propyl, butyl or vinyl group, and $R^4$O is a hydrolyzable group. $R^5$ is a substituted or unsubstituted monovalent hydrocarbon group as defined for $R^1$ in formula (1). For the ease of synthesis, $R^5$ is preferably selected from alkyl groups of 1 to 8 carbon atoms and alkenyl groups of 2 to 10 carbon atoms, typically methyl, ethyl, vinyl, and phenyl. Letter a is equal to 0 or 1.

Illustrative examples of the silane of formula (2) include alkoxysilanes such as methyltrimethoxysilane, vinyltrimethoxysilane, phenyltrimethoxysilane, methyltriethoxysilane, tetramethoxysilane, tetraethoxysilane, tetrapropoxysilane, and 3-chloropropyltrimethoxysilane, and partial hydrolysates of these organic silicon compounds.

The silane (B) is preferably used in an amount of 0.1 to 20 parts, more preferably 0.5 to 5 parts by weight per 100 parts by weight of the organopolysiloxane (A). A composition containing less than 0.1 part of the silane (B) on this basis would become short of curing whereas a composition containing more than 20 part of the silane (B) would cure into a hard product which loses the sealant function.

A third component (C) is calcium carbonate which has been surface treated with a carboxylic acid having a melting point of at least 100° C., preferably at least 150° C. Better adhesion is achieved by using calcium carbonate with a mean particle size of 0.01 to 0.2 μm and/or surface treating the calcium carbonate with 1 to 2.5% by weight the carboxylic acid.

Preferably calcium carbonate has a mean particle size of 0.01 to 0.2 μm, more preferably 0.02 to 0.1 μm. Calcium carbonate particles with a size of less than 0.01 μm tend to agglomerate whereas particles with a size of more than 0.2 μm would detract from the mechanical properties of rubber.

The type of the surface treating agent is not critical insofar as it is a carboxylic acid having a melting point of at least 100° C. Typical treating agents are rhodinic acid, abietic acid, dehydroabietic acid, and saturated fatty acids, represented by $C_nH_{2n+1}COOH$, having a melting point of at least 100° C. These treating agents may be used alone or in admixture of two or more. Abietic acid and dehydroabietic acid are preferred.

The amount of the treating agent is preferably 1 to 2.5%, more preferably 1.8 to 2.3% by weight based on the calcium carbonate. Less than 1% of the treating agent would be ineffective for the adhesion improving purpose. In excess of 2.5%, part of the treating agent can separate from the calcium carbonate, exacerbating adhesion.

Any conventional surface treating method may be employed for the treatment of calcium carbonate with the carboxylic acid.

Preferably the amount of the carboxylic acid-treated calcium carbonate blended is 10 to 200 parts, preferably 50 to 100 parts by weight per 100 parts by weight of the organopolysiloxane (A). A composition containing less than 10 parts of the calcium carbonate on this basis would flow readily, leading to working difficulties. A composition containing more than 200 parts of the calcium carbonate would be too hard, also leading to working difficulties.

In the composition of the invention, a condensation catalyst (D) is blended for promoting the curing thereof. The condensation catalyst used herein may be selected from those commonly used in this type of composition as a curing promoter. Exemplary catalysts include metal Lewis acids, for example, organic tin compounds such as dibutyltin dimethoxide, dibutyltin diacetate, dibutyltin dioctate, dibutyltin dilaurate, dimethyltin dimethoxide, and dimethyltin diacetate, and organic titanium compounds such as tetrapropyl titanate, tetrabutyl titanate, tetra-2-ethylhexyl titanate, and dimetoxytitanium diacetonate; amine compounds such as 3-aminopropyltrimethoxysilane, and salts thereof, alone or in admixture of two or more.

Usually the condensation catalyst is used in an amount of less than 10 parts, preferably 0.01 to 5 parts by weight per 100 parts by weight of the organopolysiloxane (A). More than 10 parts of the condensation catalyst would induce cracks and rupture after a durability test. Too less amounts of the condensation catalyst are undesirable for practical use because the curing time becomes long.

In addition to the condensation catalyst, the composition of the invention may contain various other additives if desired, for example, fillers, pigments, silica, dyestuffs, tackifiers, thixotropic agents, antiseptic agents, flame retardants, and antibacterial agents. These optional components are added in conventional amounts insofar as the objects of the invention are not impeded.

The RTV organopolysiloxane composition of the invention is stored in the absence of water. On use, the package is opened to expose the composition to air whereupon the composition reacts with water in air at room temperature and thus cures into a rubbery elastomer.

There has been described an RTV organopolysiloxane composition which is shelf stable and cures into a cured product capable of forming a satisfactory bond to difficult-to-bond substrates such as surface treated aluminum members, fluoro-resin coated steel strips and acrylic resin electrodeposited steel strips without a need for primer. The cured product maintains improved thermoresistant and water immersion-resistant adhesion. The composition is applicable to a wide variety of substrates, finding a wide variety of applications.

EXAMPLE

Examples of the invention are given below by way of illustration and not by way of limitation. All parts are by weight and the viscosity is a measurement at 25° C.

Example 1

A universal mixer was charged with 60 parts of a trimethoxy-terminated dimethylpolysiloxane having a viscosity of 20,000 centistokes, 50 parts of calcium carbonate with a particle size of 0.10 μm treated with 2.3% of dehydroabietic acid (melting point 172° C.), 3 parts of methyltrimethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

Example 2

A universal mixer was charged with 60 parts of a trimethoxy-terminated dimethylpolysiloxane having a viscosity of 50,000 centistokes, 50 parts of calcium carbonate with a particle size of 0.10 μm treated with 2.3% of abietic acid (melting point 175° C.), 2 parts of methyltrimethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

Example 3

A universal mixer was charged with 60 parts of a methyldimethoxy-terminated dimethylpolysiloxane having a viscosity of 20,000 centistokes, 50 parts of calcium carbonate with a particle size of 0.10 μm treated with 2.3% of abietic acid, 3 parts of methyltrimethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

Example 4

A universal mixer was charged with 60 parts of a trimethoxy-terminated dimethylpolysiloxane having a viscosity of 20,000 centistokes, 25 parts of calcium carbonate with a particle size of 0.10 μm treated with 2.3% of rhodinic acid, 25 parts of calcium carbonate with a particle size of 0.10 μm treated with 2.3% of abietic acid, 3 parts of methyltrimethoxysilane, 0.02 part of polypropylene glycol, 0.5 part of tetrabutoxytitanate, and 1 part of γ-aminopropyltriethoxysilane. The mixture was deaerated and mixed. An H shaped test specimen was prepared from this sample.

Example 5

A universal mixer was charged with 60 parts of a ethylene trimethoxysilyl-terminated dimethylpolysiloxane having a viscosity of 20,000 centistokes shown below, 43 parts of calcium carbonate with a particle size of 0.06 μm treated with 2.3% of abietic acid, 3 parts of tetramethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

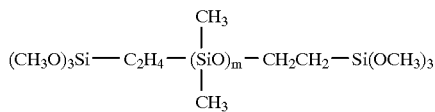

(m is a number such that the viscosity of the compound is 20,000 centistokes at 25° C.)

Comparative Example 1

A universal mixer was charged with 60 parts of a trimethoxy-terminated dimethylpolysiloxane having a viscosity of 20,000 centistokes, 50 parts of calcium carbonate with a particle size of 0.10 μm treated with 2.3% of stearic acid (melting point 72° C.), 3 parts of methyltrimethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

Comparative Example 2

A universal mixer was charged with 60 parts of a methyldimethoxy-terminated dimethylpolysiloxane having a viscosity of 20,000 centistokes, 50 parts of calcium carbonate with a particle size of 0.10 μm treated with 2.3% of a treating agent in the form of a 6/4 (weight ratio) mixture of stearic acid and oleic acid (melting point 16° C.), 3 parts of methyltrimethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

Comparative Example 3

A universal mixer was charged with 60 parts of a trimethoxy-terminated dimethylpolysiloxane having a viscosity of 50,000 centistokes, 50 parts of calcium carbonate with a particle size of 0.10 μm treated with 2.3% of stearic acid, 3 parts of methyltrimethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

Comparative Example 4

A universal mixer was charged with 60 parts of α,ω-dihydrodimethylpolysiloxane having a viscosity of 20,000 centistokes, 50 parts of calcium carbonate with a particle size of 0.10 μm treated with 2.3% of rhodinic acid, 7 parts of methyltrimethoxysilane, 0.02 part of polypropylene glycol, 0.1 part of dibutyltin dimethoxide, and 1 part of γ-aminopropyltriethoxysilane. The mixture was deaerated and mixed. An H shaped test specimen was prepared from this sample.

The RTV organopolysiloxane compositions of Examples 1–5 and Comparative Examples 1–4 were subject to a bond strength test after aging and after water immersion. The aging test included aging at 20° C. for 14 days and subsequent aging at 30° C. for 14 days. The water immersion test included the aging test and immersion in water at 50° C. for 28 days or immersion in water at 100° C. for 28 days. The bond strength test was a tensile bond strength test as prescribed in JIS A 5758 substrates of float glass, JIS aluminum, fluoro-resin coated steel strips, and acrylic resin electro-deposited steel strips.

Examination of the tensile bond test was made by visually observing the failure and determining a proportion of chhesive failure of the sealing material. As to the durability, the situation after the test was visually observed. The results are shown in Tables 1 to 3.

TABLE 1

Initial test results (aging 20° C./14 days → 30° C./14 days)

Test item
tensile bond strength
(proportion of cohesive failure of sealing material, %)

| Substrate | | Float glass | JIS aluminum | Fluororesin | Acryl electrodeposit |
|---|---|---|---|---|---|
| Example | 1 | 100 | 100 | 100 | 100 |
| | 2 | 100 | 100 | 100 | 100 |
| | 3 | 100 | 100 | 100 | 100 |
| | 4 | 100 | 100 | 100 | 100 |
| | 5 | 100 | 100 | 100 | 100 |
| Comparative Example | 1 | 100 | 100 | 100 | 100 |
| | 2 | 100 | 100 | 100 | 100 |
| | 3 | 100 | 100 | 100 | 100 |
| | 4 | 100 | 100 | 100 | 100 |

TABLE 2

Test results after water immersion
(aging 20° C./14 days → 30° C./14 days → water immersion 50° C./28 days)

Test item
tensile bond strength
(proportion of cohesive failure of sealing material, %)

| Substrate | | Float glass | JIS aluminum | Fluororesin | Acryl electrodeposit |
|---|---|---|---|---|---|
| Example | 1 | 100 | 100 | 100 | 100 |
| | 2 | 100 | 100 | 100 | 100 |
| | 3 | 100 | 100 | 100 | 100 |
| | 4 | 100 | 100 | 100 | 100 |
| | 5 | 100 | 100 | 100 | 100 |
| Comparative Example | 1 | 100 | 80 | 40 | 0 |
| | 2 | 100 | 50 | 0 | 0 |
| | 3 | 100 | 60 | 0 | 0 |
| | 4 | 100 | 100 | 100 | 100 |

TABLE 3

Test results after water immersion
(aging 20° C./14 days → 30° C./14 days → water immersion 100° C./28 days)

Test item
tensile bond strength
(proportion of cohesive failure of sealing material, %)

| Substrate | | Float glass | JIS aluminum | Fluororesin | Acryl electrodeposit |
|---|---|---|---|---|---|
| Example | 1 | 100 | 100 | 100 | 100 |
| | 2 | 100 | 100 | 100 | 100 |
| | 3 | 100 | 100 | 100 | 100 |
| | 4 | 100 | 100 | 100 | 100 |

TABLE 3-continued

Test results after water immersion
(aging 20° C./14 days → 30° C./14 days → water immersion 100° C./28 days)

Test item
tensile bond strength
(proportion of cohesive failure of sealing material, %)

| Substrate | | Float glass | JIS aluminum | Fluororesin | Acryl electrodeposit |
|---|---|---|---|---|---|
| | 5 | 100 | 100 | 100 | 100 |
| Comparative | 1 | 100 | 80 | 60 | 80 |
| Example | 2 | 100 | 50 | 40 | 30 |
| | 3 | 100 | 70 | 50 | 50 |
| | 4 | 80 | 80 | 50 | 50 |

It is evident from Tables 1 to 3 that the RTV organocompositions of the invention (Examples 1 to 5) cure onto products which establish a firm bond to difficult-to-bond substrates which bond is durably resistant to heat and water immersion.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. A room temperature vulcanizable organopolysiloxane composition comprising (A) an organopolysiloxane of the following general formula (1):

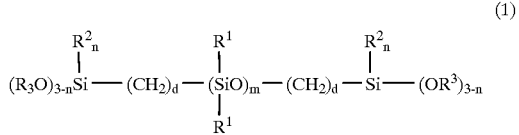

(1)

wherein $R^1$ and $R^2$ are independently selected from substituted or unsubstituted monovalent hydrocarbon groups, $R^3$ is selected from the group consisting of methyl, ethyl, propyl, butyl and vinyl, letter m is a positive integer, d is an integer of 0 to 10, and n is equal to 0 or 1, (B) a silane of the following general formula (2):

(2)

wherein $R^4$ is selected from the group consisting of methyl, ethyl, propyl, butyl and vinyl, $R^5$ is a substituted or unsubstituted monovalent hydrocarbon group, and letter a is equal to 0 or 1, (C) calcium carbonate surface treated with a carboxylic acid having a melting point of at least 100° C., and (D) a condensation catalyst.

2. The composition of claim 1 wherein the calcium carbonate has a mean particle size of 0.01 to 0.2 μm.

3. The composition of claim 1 wherein the calcium carbonate has been surface treated with 1 to 2.5% by weight based on the calcium carbonate of a carboxylic acid having a melting point of at least 100° C.

4. The composition of claim 1 wherein the carboxylic acid having a melting point of at least 100° C. in component (C) is abietic acid and/or dehydroabietic acid.

5. The composition of claim 1 wherein the condensation catalyst is a metal Lewis acid.

6. The composition of claim 1 which cures to a cured product capable of forming a water resistant bond to surface treated aluminum, fluoro-resin coated steel and acrylic resin electro-deposited steel.

7. A composition as in claim 1 which cures into a cured product capable of forming a heat resistant bond to surface treated aluminum, fluoro-resin coated steel and acrylic resin electro-deposited steel.

* * * * *